United States Patent
Chauvin et al.

(10) Patent No.: US 8,397,525 B2
(45) Date of Patent: Mar. 19, 2013

(54) DEVICE FOR CONTROLLING A CONDENSATE LIFT PUMP, AND CORRESPONDING CAPACITIVE DETECTOR AND SYSTEM

(75) Inventors: Antoine Chauvin, Saint Maurice (FR); Fabrice Leze, Charenton (FR); Michel Baillon, Reau (FR)

(73) Assignee: Sauermann Industrie, Chevry-Cossigny (FR)

( * ) Notice: Subject to any disclaimer, the term of this patent is extended or adjusted under 35 U.S.C. 154(b) by 747 days.

(21) Appl. No.: 12/559,932

(22) Filed: Sep. 15, 2009

(65) Prior Publication Data

US 2010/0064705 A1    Mar. 18, 2010

(30) Foreign Application Priority Data

Sep. 16, 2008    (FR) ...................... 08 56224

(51) Int. Cl.
*F25D 21/00* (2006.01)
*G01F 23/26* (2006.01)
*G01R 27/26* (2006.01)
(52) U.S. Cl. ................... 62/150; 73/304 C; 324/688
(58) Field of Classification Search .............. 62/150; 73/304 C; 340/620; 700/282; 324/688
See application file for complete search history.

(56) References Cited

U.S. PATENT DOCUMENTS

| | | | | |
|---|---|---|---|---|
| 5,562,003 A * | 10/1996 | Lefebvre | .................. | 73/308 |
| 6,563,328 B1 * | 5/2003 | Lenormand et al. | .......... | 324/663 |
| 6,761,067 B1 | 7/2004 | Capano | | |
| 7,219,545 B2 * | 5/2007 | Salzmann et al. | .......... | 73/304 R |
| 2008/0092647 A1 * | 4/2008 | Kumazawa et al. | ........ | 73/304 C |

FOREIGN PATENT DOCUMENTS

| | | | | |
|---|---|---|---|---|
| DE | 2550522 A | * | 5/1977 | |
| EP | 167431 A1 | * | 1/1986 | |
| EP | 1 522 829 A2 | | 4/2005 | |
| FR | 2691537 A1 | * | 11/1993 | |
| FR | 2 716 715 A1 | | 9/1995 | |
| GB | 2 170 331 | | 7/1986 | |
| JP | 7-103805 A | | 4/1995 | |
| JP | 2003344139 A | * | 12/2003 | |
| JP | 2007-205812 A | | 8/2007 | |
| JP | 2007-240472 A | | 9/2007 | |

* cited by examiner

Primary Examiner — Chen Wen Jiang
(74) Attorney, Agent, or Firm — Hamre, Schumann, Mueller & Larson, P.C.

(57) ABSTRACT

The invention relates to a device for controlling a condensate lift pump, comprising a means for detecting at least two condensate levels in a container, and a means for activating and for stopping the pump according to the levels, in which the detection means comprises a capacitive detector comprising at least three electrodes: a ground electrode; a first level detection electrode; and a second level detection electrode, and a processing means comprising a means for measuring the capacitance between the electrodes. According to the invention, the lengths of the first level detection electrode and second level detection electrode are defined so as to come into contact with the condensates, when the condensates respectively reach the first level and the second level in the container; these electrodes are produced on distinct supports not having a submergible physical continuity between them.

13 Claims, 4 Drawing Sheets

Figure 1:
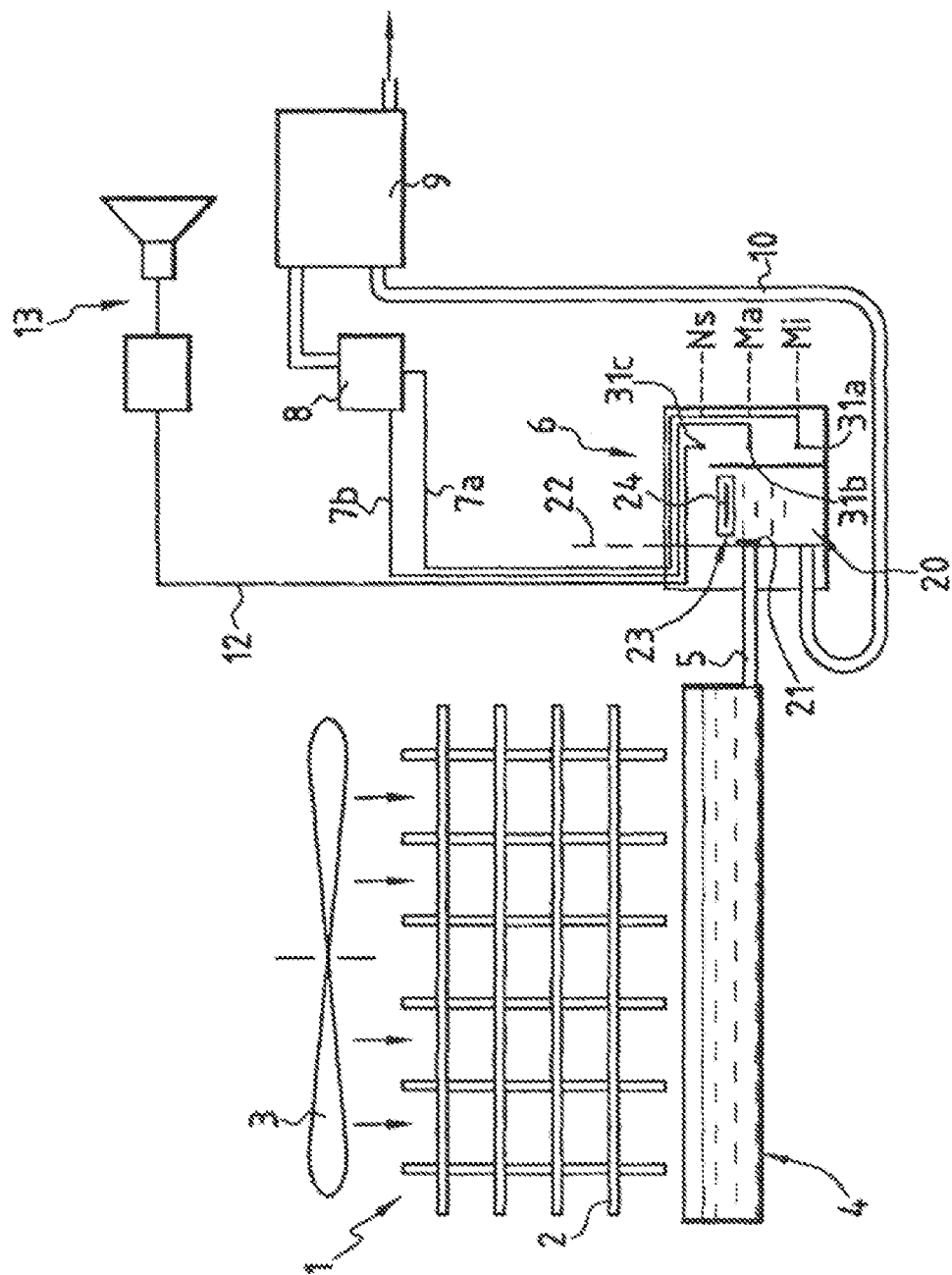

Fig. 1 --PRIOR ART--

DEVICE FOR CONTROLLING A CONDENSATE LIFT PUMP, AND CORRESPONDING CAPACITIVE DETECTOR AND SYSTEM

FIELD OF THE INVENTION

The field of the invention is that of controlling liquid or condensate lift pumps, in particular in air conditioning systems, cooling systems, ventilation systems or heating systems.

More specifically, the invention relates to the detection of condensate levels, in a container, so as to control the activation of a pump in such systems.

PRIOR ART

Installation Example

In these various systems or installations, the condensates, which result from condensation of the water vapor present in the ambient air that is cooled, are generally collected in a vat, or more generally in a collection container, which can in some cases be a simple collection panel. It is therefore necessary to remove the collected condensates, so as to prevent, on the one hand, overflow of the collection container and to limit, on the other hand, the risks of bacterial contamination associated with stagnation of the condensates in said container. This can be achieved by means of gravity, for example by means of a rigid or semi-rigid tube associated with a wastewater disposal system, or by pumping the condensates collected into an accumulation vat.

As an example, an air conditioning system with a known structure is diagrammatically shown in FIG. 1.

The system 1 comprises an exchanger 2 inside of which a coolant circulates, a fan 3 intended to cause the ambient air to move so as to bring it in contact with the exchanger 2 in order to improve heat exchanges, and a condensate collection vat 4 arranged below the exchanger. When the more or less humid ambient air is cooled in contact with the exchanger 2, the water vapor contained in the air condenses and droplets form on the external walls of the exchanger. These droplets then fall due to gravity into the main collection vat 4.

To remove the condensates collected in the vat 4, the system comprises a pump 9 controlled, i.e. in particular activated and stopped, by means of a condensate level detection device 6. The pump 9 can be, for example, according to applications and requirements, a piston pump, a centrifugal pump, a peristaltic pump, a membrane pump, and so on.

Detection of Condensate Levels

A number of techniques for producing a condensate level detection device are already known. A first approach is described, for example, in patent document FR 2 716 715.

This detection device 6 comprises a container 20 that communicates, on the one hand, with the vat 4 by means of a discharge conduit 5, and, on the other hand, with the pump 9, by means of a suction conduit 10. Inside of the container 20 is a float 23, which is free to move vertically according to the condensate level in the container. This float 23 also contains a magnet 24.

Three reed switches 31a, 31b, 31c, each sealed in a bulb and attached to the exterior side of a wall of the container 20, are placed in the vicinity of the trajectory of the magnet. These reed switches are capable of being closed due to the magnetic field of the magnet 24. The switches 31a and 31b are connected by means of two electrical circuits 7a and 7b to the control 8 of the hydraulic pump 9. The switch 31c is connected by means of an electrical circuit 12 to the control of an alert system 13.

These switches 31a, 31b, 31c are located at three different heights, each corresponding substantially to three condensate levels inside the container 20:
   a minimum level Mi;
   a maximum allowable level Ma, greater than the level Mi; and
   a safety level Ns, greater than the level Ma.

In the normal mode of operation of the system 1, the height of the condensates inside the container 20 is between levels Ma and Mi. When the height of the condensates increases to the level Ma, the magnet 24 rises to the height of the switch 31b, which closes. The control device 8 then detects the closure of the electrical circuit 7b and activates the pump 9 so as to suction the condensates via the suction conduit 10. The pump 9 then generally pushes said condensate toward a wastewater line (not shown).

During pumping, the height of the condensates in the container 20 falls to the level Mi, so that the magnet arrives at the height of the switch 31a, which closes. The electrical circuit 7a is then closed and the control device 8 stops the operation of the pump 9.

In this type of system, it is possible for the pump 9 to become plugged or unserviceable, for the switch 31b located at the level Ma to become unserviceable, or for the condensation of the water vapor to be abnormally high. In this type of situation, the condensates are no longer pumped, or are not pumped fast enough, which can thereby result in overflow of the vat 4.

In this case, the height of the condensates inside the container 20 increases to the level Ns so that the switch 31c closes or opens, according to the type of connection. The closure or opening of the electrical circuit 12 triggers the activation of the alert system (sound and/or visual signal, and/or emission of an alert signal, for example), which informs the user or a maintenance agent of the malfunction and therefore of the risk of overflow of the container of the device 6 or of the liquid collection vat 4, and/or which cuts off the cold water supply to the exchanger 2, and/or which stops the air conditioning system 1.

This known type of condensate level detection device nevertheless has disadvantages associated with the impurities (dust, fibers, etc.) initially present in the environment of the system 1 and which are found in the condensates collected in the vat 4. To prevent these impurities from entering the container 20, a filter 21 is provided between the vat 4 and the container 20. As this filter 21 becomes fouled, it is necessary to clean it regularly so as to prevent it from becoming clogged, which would result in an overflow of the vat 4.

In addition, it is noted that certain small impurities are not filtered by the filter 21, and become attached to the surface of the float 23, which inevitably gets fouled. However, this fouling disrupts the movement of the float 23 inside of the container 20, thereby causing it to be immobilized in the bottom portion of the container 20.

The presence of microorganisms, such as bacteria or fungi, can also cause, under certain conditions, bio-films to form in the container 20. Similarly, these bio-films can disrupt the movement of the float 23.

The float 23 can then no longer perform its role, and, as the liquid rises, the operation of the pump 9 and/or the activation of the alarm 13 are no longer ensured, so that the container 20 or the collection vat 4 overflow.

Another level detection technique is described in patent document EP 1 522 829. According to this approach, optical sensors are implemented for detecting the Mi and Ma condensate levels. The float is kept only to detect the safety level Ns, and is therefore no longer subject to fouling, since it is not in contact with the condensate while the pump operates normally.

A disadvantage of this technique is that the fouling and the bio-films can cover the tube containing the sensors and/or disrupt the trajectory of light, preventing or distorting level detections.

Another disadvantage is that, like the preceding technique, it still requires the presence of moving mechanical means, at least for the safety level. This mechanical means assumes precise and costly assembly, and can still be blocked or seized.

In addition, the presence of a float assumes that the container is placed in a precise horizontal position in order for the operation to be effective and the detection to be precise.

It has also been proposed, in some systems, that only a single level be detected, corresponding to the maximum level Ma. When the condensate level reaches the maximum level Ma, the pump is activated for a fixed duration (for example 30 s), controlled by a timing system.

This approach is simpler, but less effective, since the pumping duration is fixed, and can be too long or too short according to the situation.

OBJECTIVES OF THE INVENTION

The invention is intended in particular to overcome these disadvantages of the prior art.

More specifically, an objective of the invention is to provide a technique for controlling a condensate lift pump that is simple and effective, and inexpensive to implement.

At least according to one embodiment, an objective of the invention is to provide such a technique that enables the need for mobile mechanical elements to be eliminated.

Another objective of the invention, according to at least one embodiment, is to provide such a technique that is insensitive or only slightly sensitive, with respect to the prior art, to fouling and bio-films.

Yet another objective of the invention, according to an embodiment, is to provide such a technique that is less sensitive than the known techniques to the position of the container with respect to the horizontal.

The invention is also intended, according to at least one embodiment, to provide such a technique that is more precise and more effective than the systems implementing a single sensor and a timing system.

SUMMARY OF THE INVENTION

These objectives, as well as others which will appear below, are achieved by a device for controlling a condensate lift pump, comprising a means for detecting at least two condensate levels in a container, and a means for activating and for stopping said pump according to said levels, in which said detection means comprises a capacitive detector comprising at least three electrodes, each comprising a conductive armature isolated by at least one dielectric isolation element, connected to a means for processing:
a ground electrode;
a first level detection electrode; and
a second level detection electrode,
in which said processing means comprises a means for measuring a first capacitance between said ground electrode and said first level detection electrode and a second capacitance between said ground electrode and said second level detection electrode.

According to the invention, the lengths of said first level detection electrode and second level detection electrode are defined so as to come into contact with said condensates, when the condensates respectively reach said first level and said second level in said container, and these electrodes are produced on distinct supports not having a submergible physical continuity between them.

Thus, the invention enables condensate levels to be measured without any mobile mechanical means, based on simple and relatively inexpensive elements, and can have a reduced bulk. The device is also less sensitive to a variation in the angular positioning of the container with respect to the horizontal.

The first and second levels can correspond, for example, respectively to a minimum level, beyond (under) which the pump must be stopped, and a maximum level, beyond (above) which the pump must be activated.

Said electrodes can in particular be intended for extending perpendicularly to the free surface of said condensates, over at least a portion of the length thereof.

They extend beyond said alarm level, so that an upper portion of each of said electrodes is never in contact with said condensates.

These are therefore "island" electrodes. Such electrodes make it possible in particular to more effectively prevent any bio-films, which could create undesirable electrical connections between certain electrodes.

Advantageously, the device of the invention also comprises a reference electrode, so that said measurement means also provides a reference capacitance, measured between said ground electrode and said reference electrode.

This reference capacitance can enable reliable information, independent of the characteristics of the condensates, to be determined. It is thus possible to eliminate any calibration.

In particular, said processing means can then determine reduced capacitances, for each of said detection electrodes, corresponding to a ratio between the capacitance measured between said ground electrode and, on the one hand, said detection electrode, and, on the other hand, said reference capacitance.

According to an advantageous embodiment, the device of the invention also comprises an alarm level detection electrode, with a length shorter than said second level detection electrode, in which said measurement means also provides a third capacitance, measured between said ground electrode and said alarm level detection electrode.

According to a preferred implementation of the invention, said electrodes are coplanar. In particular, they can be produced in the extension of a printed circuit support with at least a portion of said processing means.

According to a particular embodiment, at least a portion of said armatures is coated with and/or housed in a material with a high dielectric constant, with a value above 4, for example, ceramic.

According to a specific implementation, the device of the invention comprises a galvanic isolation means, for example in the form of a transformer.

It is possible, however, to do without that, in particular if the dielectric material is thick enough.

In a specific implementation, at least a portion of said electrodes is made of a conductive resin.

It can in particular be cast in a ceramic support.

The invention also relates to capacitive detectors for a control device as described above, as well as air conditioning, cooling and/or heating systems comprising at least one pump for lifting condensates contained in a container, and such a control device.

LIST OF FIGURES

Figure 2:
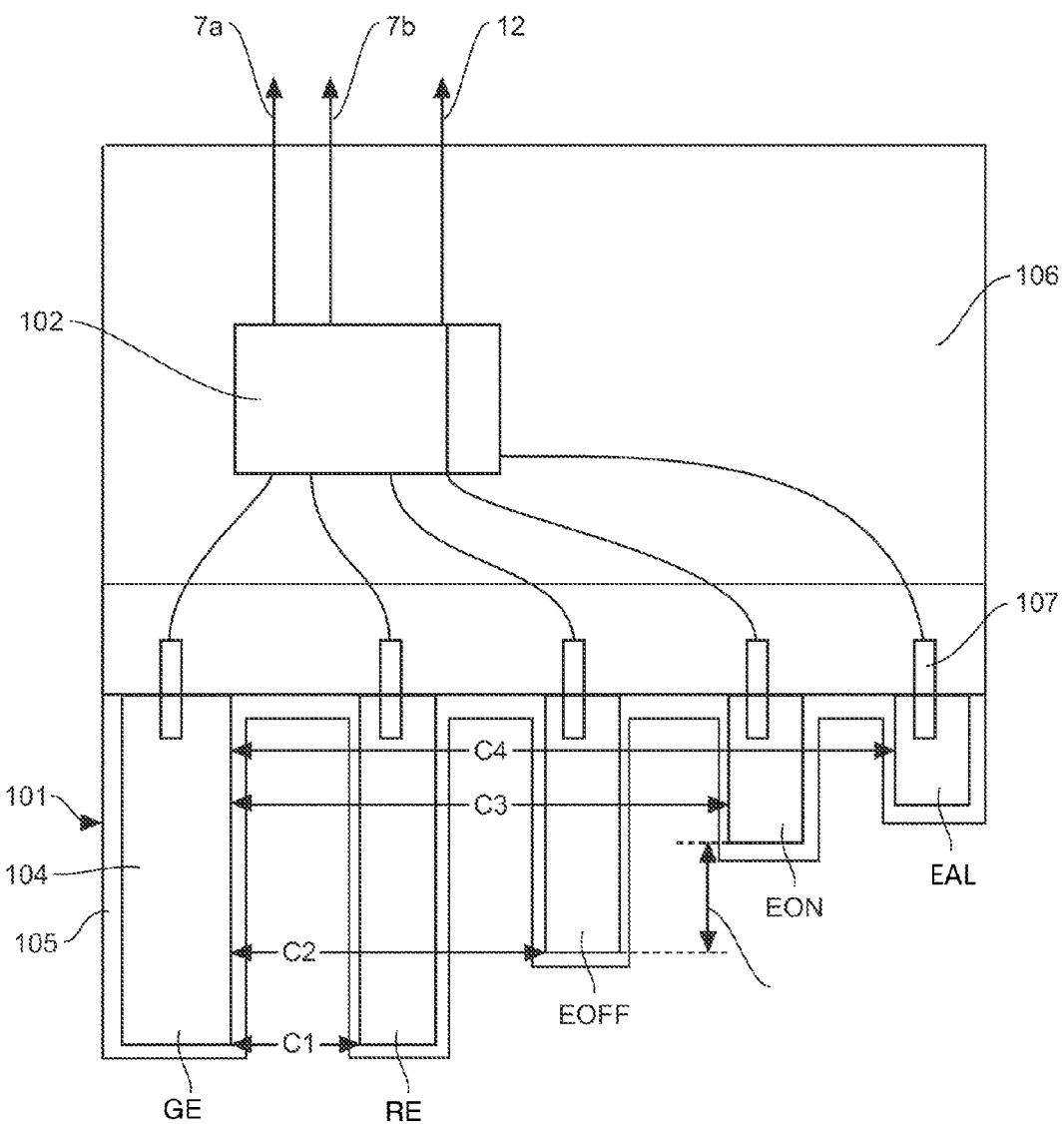
Figure 3:
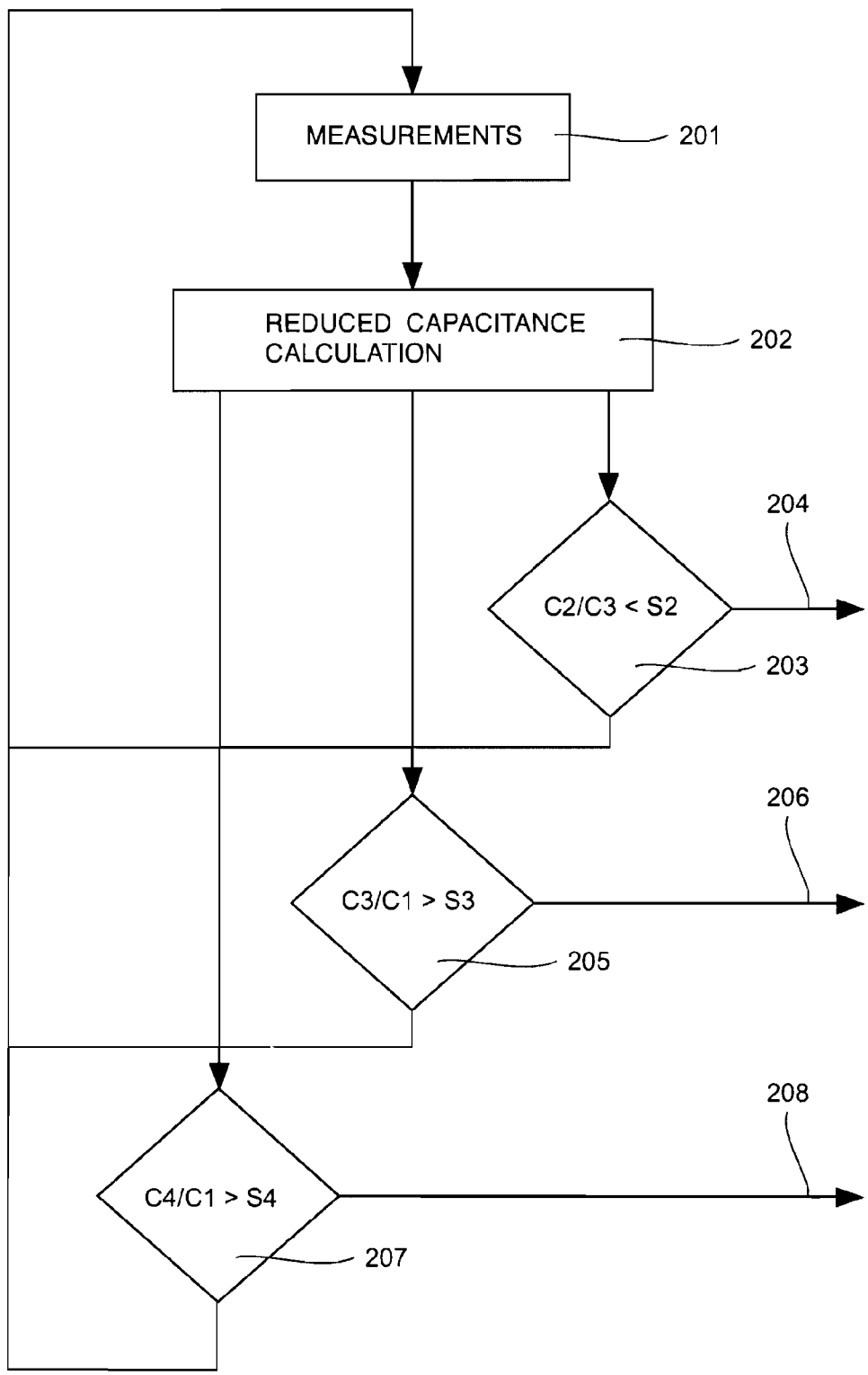
Figure 4:
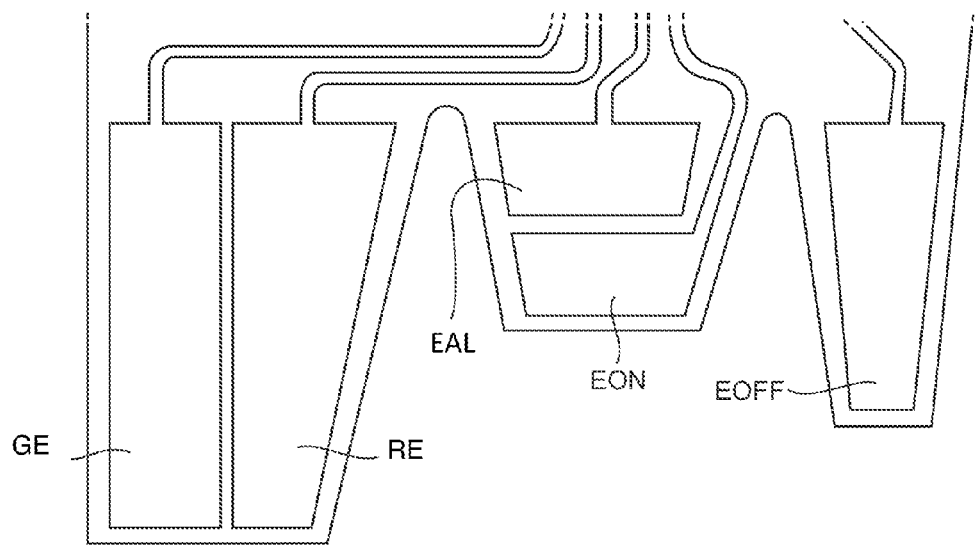
Figure 5:
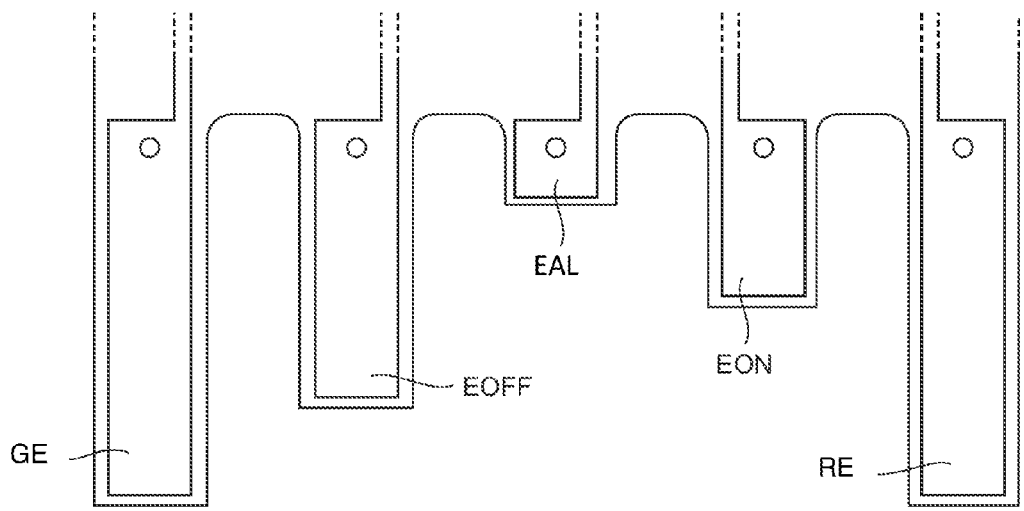

Other features and advantages of the invention will appear in the following detailed description of a preferred embodiment of the invention, provided by way of a simple and non-limiting example, and the appended drawings in which:

FIG. 1, already discussed in the preamble, diagrammatically shows an example of an air conditioning system, known per se;

FIG. 2 diagrammatically shows a first embodiment of a control device according to the invention, capable of being implemented in particular in the system of FIG. 1, in place of the float sensor;

FIG. 3 diagrammatically shows the operation of the processing means of the device of FIG. 2, according to a specific embodiment;

FIG. 4 diagrammatically shows an example of a sensor according to the invention, with island electrodes;

FIG. 5 shows another example of a sensor according to the invention, with partial island electrodes.

DESCRIPTION OF A SPECIFIC EMBODIMENT

Introduction

The invention therefore proposes a new approach to controlling a condensate lift pump, in so-called HVACR ("Heating, Ventilation, Air-Conditioning, Refrigeration") systems. In some of these systems, of which an example is shown in FIG. 1, already discussed, a condensate lift pump is provided, belonging for example to the group comprising piston pumps, centrifugal pumps, peristaltic pumps, membrane pumps, and so on.

This pump is associated with a level detector, which can be combined in the same assembly with the pump (so-called one-piece pump) or separated from it (so-called two-piece pump). According to the applications and requirements, the pump and/or the detector can be mounted in, below or next to the air-conditioning unit, as the case may be in a gutter provided for this purpose.

According to the invention, the detector rests on a capacitive sensor, configured so as to be capable of measuring at least two levels, a first level corresponding, for example, to the minimum level Mi and a second level corresponding for example to the maximum level Ma of FIG. 1.

FIG. 2 diagrammatically shows a device according to the invention, in an advantageous embodiment with five electrodes.

This device therefore comprises, on the one hand, a capacitive detector 101, and, on the second hand, a processing means 102, providing the required commands 7a and 7b, to the pump 9 and, as the case may be, the command 12 to the alarm means 13 (FIG. 1), according to the measurements provided by the detector 101.

Capacitive Sensor Structure

The capacitive detector in this case comprises five electrodes:
 a ground electrode GE;
 a reference electrode RE, for creating a capacitance C1 with the electrode GE;
 a first level electrode EOFF, for creating a capacitance C2 with the electrode GE;
 a second level electrode EON, for creating a capacitance C3 with the electrode GE;
 an alarm level electrode EAL, for creating a capacitance C4 with the electrode GE.

It is noted that the lengths of these electrodes are different. They indeed enable different condensate levels to be detected, in the container 103 in which they are immersed. Indeed, the capacitance Ci measured varies, depending on whether or not one of the electrodes is in contact with the condensates.

Thus, the electrode GE is sized so as to always be in contact with the condensates, and therefore to penetrate the container, beyond (under) a minimum level. The reference electrode RE, of which the role is discussed in detail below, has the same length as the electrode GE, so as to enable a reference capacitance C1 to be continuously produced.

The first level detection electrode EOFF has a length such that its lower end corresponds to a minimum condensate level, in the embodiment shown, i.e. the level at which the pump should be stopped.

The second level detection electrode EON has a length such that its lower end corresponds to a maximum condensate level, in the embodiment shown, i.e. the level at which the pump should be activated.

The alarm electrode EON has a length so that its lower end corresponds to an alarm level, in the embodiment shown, i.e. the level at which an alarm should be generated.

The pump is therefore operating when, substantially, the condensate level is between electrodes EOFF and EON (arrow 109).

It is understood that, according to the approach of the invention, it is possible to remove or add electrodes, as needed. For example, the reference electrode can be removed if a reduced capacitance calculation as described below is not implemented. Similarly, the alarm electrode can be removed, in particular if the alarm is managed by another means, such as a float as proposed in document EP 1 522 829, mentioned earlier. Conversely, it is possible to add electrodes, for example in order to double the measurements, or in order to detect intermediate levels, which can be useful in certain applications.

The various electrodes can be made of a conductive resin 104, which can be injected into recesses provided for this purpose in a dielectric ceramic cell 105. The term "electrode" should therefore be understood, in the sense of the invention, as being a conductive element (in this case called an armature) isolated from the condensates by a dielectric isolation element.

The electronic board, or the printed circuit support, 106, in particular with processing means 102, has conductive inserts 107, which are introduced into the resin 104, during injection thereof.

Other modes of production can of course be envisaged. In particular, the electrodes can be copper-coated plates, as the case may be formed directly on the printed circuit 106. Similarly, the electrical isolation element can be made of a distinct cell for each electrode, and/or a dielectric material added to the armature, for example by over-molding.

To meet the requirements of galvanic isolation, i.e. electrical isolation of the circuit with the outside, it is possible to provide an electrical transformer on the printed circuit. This is desirable in particular if the thickness of the dielectric is low (for example on the order of 0.1 mm).

It is possible, however, to eliminate the need for such a transformer, which is expensive, heavy and bulky, by increasing the thickness of the dielectric 105, for example on the order of 1 or 2 mm. It is thus possible to provide a so-called "thick-wall" dielectric element, which constitutes a portion of the wall of the detector and which satisfies the legal requirements of a submerged insulant.

Of course, the increase in the thickness of the dielectric results in a decrease in the electrical flow. To limit this disadvantage, it is possible to increase the surface of the electrodes, and/or to increase the permittivity of the dielectric. It is possible in particular to use a ceramic with a very dielectric constant (for example above 4 or 5), or any other suitable material.

The various electrodes are produced on distinct supports not having a submergible physical continuity between them. In other words, the electrodes are "island" electrodes, i.e. they extend beyond said alarm level, so that an upper portion of each of said electrodes is never in contact with said condensates. This makes it possible in particular to prevent a moist film, or a bio-film, from forming between two electrodes, which can form an electrical conductor. Indeed, in this case, the measurement would be identical or similar to that obtained during submersion, thereby resulting in undesirable activations or stoppings of the pump, or the generation of false alarms.

Measurement Processing

The processing performed by the processing means 102 is diagrammatically presented in FIG. 3, according to a specific implementation.

The processing means 102 obtain (201) four capacitance values C1, C2, C3 and C4, acquired by means of the electrodes, as shown in FIG. 2.

It then calculates (202) three reduced capacitances, i.e. the ratios between the capacitances C2, C3 and C4 and the reference capacitance C1. It therefore provides C2/C1, C3/C1 and C4/C1. It should be noted that this operation is not required, but that the inventors have observed that it generally enables the need for a precise calibration according to environmental parameters capable of influencing the capacitance to be eliminated. The tests performed indeed show that the measurements of the capacitances of water are highly variable, according to diverse parameters. However, the reduced capacitances are substantially independent of these aspects.

When the condensates reach one of the electrodes EOFF, EON or EAL, the corresponding reduced capacitance C2/C1, C3/C1 or C4/C1 varies strongly, going from a value close to 0 to a value close to 1. A comparison with thresholds therefore enables the pump to be controlled, and, as the case may be, an alarm to be generated:

203: if C2/C1<S2, the minimum level is reached: a command 204 to stop the pump is then transmitted;
205: if C3/C1>S3, the maximum level is reached: a command 206 to start the pump is then transmitted;
207: if C4/C1>S4, the alarm level is reached: a command 208 to generate an alarm is then transmitted.

Examples of Sensors

As an example, FIG. 4 shows a possible distribution of electrodes, in a specific so-called island embodiment. The electrodes extend vertically.

Another possible distribution, called a partial island distribution, is shown in FIG. 5. In this embodiment, which is intended in particular to increase the surface of the electrodes in a reduced space, the electrodes GE and RE are adjacent to one another, and electrodes EON and EAL are placed essentially horizontally, one above the other.

Other distributions and shapes are of course possible. For example, at least some of the electrodes of FIG. 4 could have an L shape or a J shape, with a lower portion extending horizontally.

The invention claimed is:

1. A device for controlling a condensate lift pump, comprising a means for detecting at least two condensate levels in a container, and a means for activating and for stopping said pump according to said levels, in which said detection means comprises a capacitive detector comprising at least three electrodes (GE, RE, EOFF, EON, EAL), each comprising a conductive armature isolated by at least one dielectric isolation element, connected to a means for processing:

a ground electrode (GE);
a first level detection electrode (EOFF); and
a second level detection electrode (EON),
wherein said processing means comprises a means for measuring a first capacitance (C2) between said ground electrode (GE) and said first level detection electrode (EOFF) and a second capacitance (C3) between said ground electrode (GE) and said second level detection electrode (EON),
wherein the lengths of said first level detection electrode (EOFF) and second level detection electrode (EON) are defined so as to come into contact with said condensates, when the latter respectively reach said first level and said second level in said container,
and wherein the electrodes are produced on distinct supports not having a submergible physical continuity between them.

2. Control device according to claim 1, wherein the capacity detector comprises a reference electrode (RE), and wherein said measurement means is arranged so as to also provide a reference capacitance (C1), measured between said ground electrode (GE) and said reference electrode (RE).

3. Control device according to claim 2, wherein said processing means determines reduced capacitances, for each of said detection electrodes, corresponding to a ratio between the capacitance (C2, C3) measured between said ground electrode (GE) and, on the one hand, said detection electrode (EOFF, EON), and, on the second hand, said reference capacitance (C1).

4. Control device according to claim 1, wherein the capacity detector comprises an alarm level detection electrode (EAL), with a length shorter than said second level detection electrode (EON), in which said measurement means also provides a third capacitance (C4), measured between said ground electrode (GE) and said alarm level detection electrode (EA).

5. Control device according to claim 1, wherein said electrodes (GE, RE, EOFF, EON, EAL) are coplanar.

6. Control device according to claim 5, wherein said electrodes (GE, RE, EOFF, EON, EA) are produced in an extension of a printed circuit support carrying at least a portion of said processing means.

7. Control device according to claim 1, wherein said electrodes (GE, RE, EOFF, EON, EAL) are intended for extending perpendicularly to the free surface of said condensates, over at least a portion of the length thereof, and extend beyond said alarm level, so that an upper portion of each of said electrodes is never in contact with said condensates.

8. Control device according to claim 1, wherein at least a portion of said armatures is coated with and/or housed in a material with a dielectric constant having a value above 4.

9. Control device according to claim 8, wherein said material is ceramic.

10. Control device according to claim 1, wherein the control device comprises a galvanic isolation means.

11. Control device according to claim 1, wherein at least a portion of said electrodes (GE, RE, EOFF, EON, EAL) is made of a conductive resin.

12. A capacitive detector for a control device of a condensate lift pump comprising at least three electrodes (GE, RE, EOFF, EON, EA) each comprising a conductive armature isolated by at least one dielectric isolation element, connected to a means for processing:
- a ground electrode (GE);
- a first level detection electrode (EOFF); and
- a second level detection electrode (EON),
- wherein said processing means comprises a means for measuring a first capacitance (C2) between said ground electrode (GE) and said first level detection electrode (EOFF) and a second capacitance (C3) between said ground electrode (GE) and said second level detection electrode (EON),
- wherein the lengths of said first level detection electrode (EOFF) and second level detection electrode (EON) are defined so as to come into contact with said condensates, when the latter respectively reach said first level and said second level in said container,
- and wherein the electrodes (GE, EOFF, EON) are produced on distinct supports not having a submergible physical continuity between them.

13. An air conditioning, cooling and/or heating system comprising at least one pump for lifting condensates contained in a container, and a device for controlling said pump, comprising a means for detecting at least two condensate levels in said container, and a means for activating and for stopping said pump according to said levels,
- wherein said detection means comprises a capacitive detector comprising at least three electrodes (GE, RE, EOFF, EON, EAL), each comprising a conductive armature isolated by at least one dielectric isolation element, connected to a means for processing:
- a ground electrode (GE);
- a first level detection electrode (EOFF); and
- a second level detection electrode (EON),
- in which said processing means comprises a means for measuring a first capacitance (C2), between said ground electrode (GE) and said first level detection electrode (EOFF), and a second capacitance (C3), between said ground electrode (GE) and said second level detection electrode (EON),
- wherein the lengths of said first level detection electrode (EOFF) and second level detection electrode (EON) are defined so as to come into contact with said condensates, when the condensates respectively reach said first level and said second level in said container,
- and wherein these electrodes (GE, EOFF, EON) are produced on distinct supports not having a submergible physical continuity between them.

* * * * *